Jan. 28, 1969 H. J. KROL ET AL 3,425,023

MOUNTING DEVICE FOR CYLINDRICALLY SHAPED ELECTRICAL COMPONENTS

Filed Dec. 18, 1967 Sheet 1 of 2

Inventors
Harry J. Krol
Francis E. Ryder
By: Olson, Trexler, Wolters & Bushnell Attys.

Inventors
Harry J. Krol
Francis E. Ryder
By: Olson, Trexler, Wolters & Bushnell Attys.

3,425,023
Patented Jan. 28, 1969

3,425,023

MOUNTING DEVICE FOR CYLINDRICALLY SHAPED ELECTRICAL COMPONENTS

Harry J. Krol, Arlington Heights, and Francis E. Ryder, Des Plaines, Ill., assignors to Illinois Tool Works Inc., Chicago, Ill., a corporation of Delaware Filed Dec. 18, 1967, Ser. No. 691,311
U.S. Cl. 339—59 7 Claims
Int. Cl. H01f 9/12; H02b 1/02; H01r 13/50

ABSTRACT OF THE DISCLOSURE

A rectifier mounting device according to the invention comprising a one-piece molded plastic unit which is molded substantially flat and subsequently folded upon itself, having a base portion provided with a fastener which can be snapped into an aperture in a panel board or chassis of television or the like equipment, and supported by the base portion of the device on opposite ends thereof, in an opposing relation to each other, a pair of insulated, snap together, sockets. Each of the sockets receives therein a specially designed terminal which is able to accommodate, both mechanically and electrically, rectifier terminals of various sizes; at least one of the socket terminals is spring loaded to provide for differences in lengths of the variously sized cartridge rectifiers received in the sockets.

*Background of the invention*

This invention relates generally to apparatus for mounting cylindrically shaped electrical components and more particularly for holding and mounting cartridge type rectifiers.

In the television art, as well as other communications or the like fields, several forms of cartridge type rectifiers are being used. Many of these forms or types of rectifiers are available in different sizes and lengths. To mount the variously sized rectifiers in television receivers or the like equipment, a corresponding number of mounting assemblies or devices are presently required. This means that large inventories of mounting devices must be kept by repairmen and those supplying the devices to television manufacturers; and consequently they must incur a greater cost in so doing.

*Summary of the invention*

The invention relates to a dielectric mounting device being capable of use with various sizes of cartridge-type electrical components in spaced relation to a mounting panel and having terminal means which initially consist of a pair of interconnected hinge cavity halves which are adapted to form the sockets for acceptance of the ends of an electrical component.

Accordingly, it is a general object of this invention to provide a new and improved mounting device for use with various sizes of cartridge type electrical components.

It is a more specific object of this invention to provide a new and improved cartridge type rectifier mounting device which can accommodate variously sized rectifier units.

It is another object of this invention to provide a new and improved rectifier mounting device of the last-mentioned type which is of a one-piece molded, corona resistant, plastic construction.

It is yet another object of this invention to provide a cartridge type rectifier mounting device of the above-mentioned type which is inexpensive to manufacture and which serves to mount a rectifier unit held therein to the chassis of a television or the like receiver easily and simply without requiring screw or the like fasteners.

*Description of the drawings*

A better understanding of the present invention and its organization and construction may be had by referring to the description below in conjunction with the accompanying drawings, of which.

*Detailed description*

Figures 1, 2, 3, 4, 5, 6:
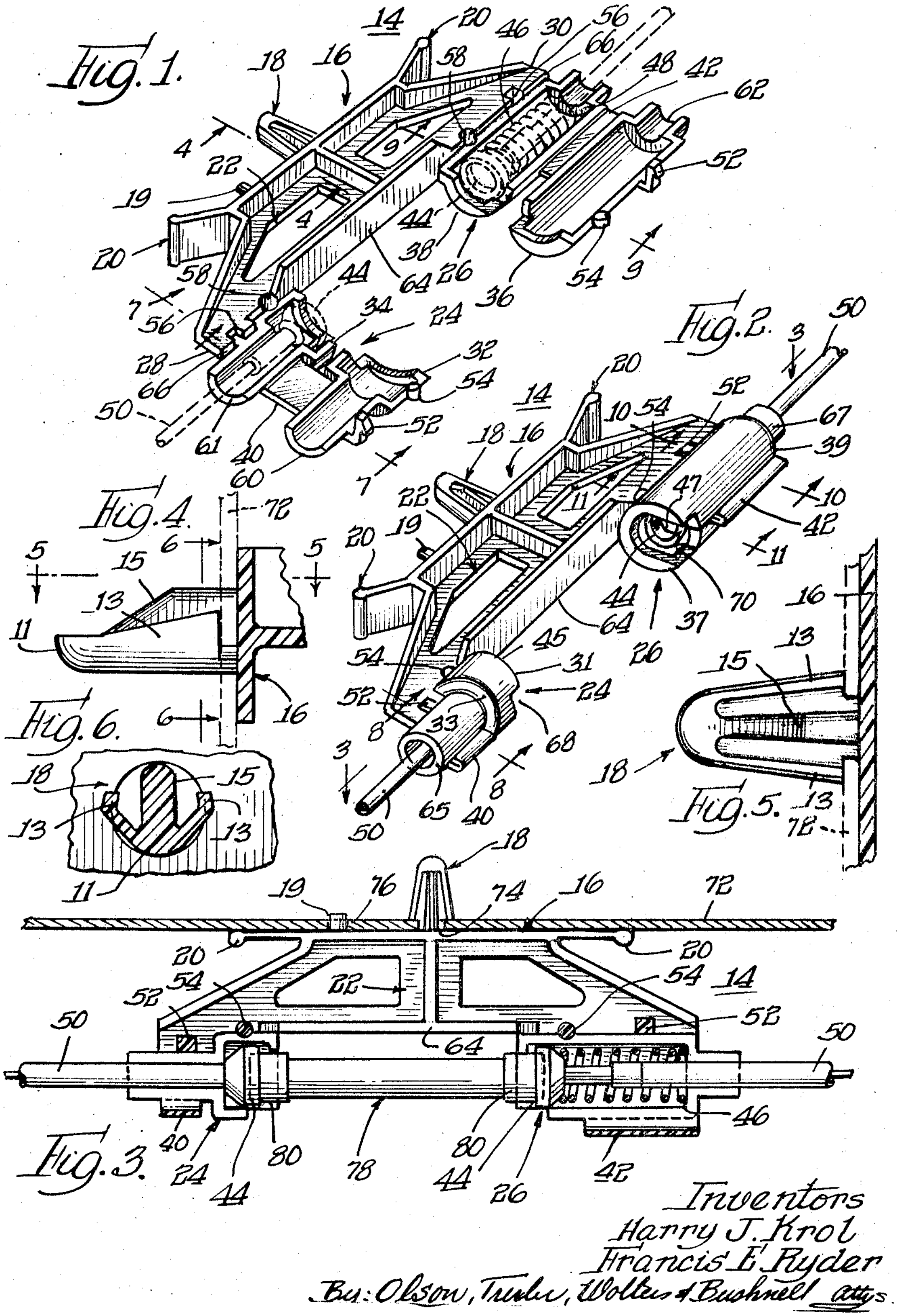
FIG. 1 is a perspective view of a rectifier mounting device according to the invention, shown in an open or unassembled state.
FIG. 2 is a perspective view of the rectifier mounting device of FIG. 1 of the drawings as it appears when closed or assembled.
FIG. 3 is a longitudinal sectional view of the rectifier mounting device taken along the line 3—3 in FIG. 2, shown mounted on a panel board or chassis and holding a cartridge type rectifier unit in the sockets thereof.
FIG. 4 is a side view on an enlarged scale of a snap-fastener stud portion of the rectifier mounting device taken along the line 4—4 in FIG. 1.
FIG. 5 is a side view of the snap-fastener stud portion shown in FIG. 4, taken at a right angle to FIG. 4 along the line 5—5 thereof.
FIG. 6 is a cross-sectional view of the snap-fastener stud portion shown in FIG. 4 and taken along the line 6—6 thereof.

Referring now to the drawings more in detail, FIGS. 1 and 2 thereof illustrate a preferred embodiment of a mounting device 14 according to the invention. This particular embodiment is designed to accommodate cartridge type rectifiers, but with little or no modification could be used to accommodate other cylindrically shaped electrical components. The device 14, which is of a one-piece molded plastic construction, is shown in FIG. 1 as it appears immediately after it has been molded. The mounting device 14 comprises a base portion 16 which includes a pair of resilient foot members 20 extending at an acute angle from either side thereof and extending outwardly therebetween a snap-fastener stud 18 and keying or guide pin 19. The stud, guide pin and foot members serve to mount the device 14 to a panel board or chassis of a television or the like receiver, as will be described in more detail below.

The base portion 16 of the device further includes a truss-like support structure 22. Integrally formed with and supported by the support structure 22 are a pair of cylindrical sockets 24 and 26, respectively, best seen in FIG. 2 of the drawings. The sockets are located on opposite ends 28 and 30 of the support structure 22, in an opposing relation to each other. Each of the socket members includes a pair of cavity halves or sections 32 and 34, and 36 and 38, respectively, having an integral hinge section, 40 and 42, respectively, therebetween. The socket members 24 and 26 serve to receive terminals such as 44 therein (shown in dotted lines in FIG. 1 of the drawings).

As can be seen in FIG. 1, each of the terminals 44 is placed into a cavity section 34 and 38, respectively, of sockets 24 and 26. It will be noted that socket 26 is longer than socket 24 and includes therein a coil spring 46 which is placed between corresponding terminal 44 and the opposite end 48 of cavity section 38, so that the terminal 44 is able to be moved against the spring 46; thus sockets 24 and 26 can accommodate therebetween cartridge type rectifiers or the like of varying lengths. Each of the terminals 44 has connected thereto in a known manner, such as soldering or mechanically gripping, a length of lead wire such as 50. It is obvious that the lead wires 50 are for connection to circuitry (not shown) external of the mounting device. To secure the respective terminals 44 in their respective sockets, cavity sections 32 and 36, are swung or folded over cavity sections 34 and 38, respectively, to form the completed sockets 24 and 26. Respective flange half members 31, 33 and 37, 39 (FIG. 1) are joined (FIG. 2) upon the mating of the cavity sections to secure the terminals 44 within resulting sockets 24 and 26, respectively. Front openings 45 and 47 of respective sockets 24 and 26 are thus formed to receive therein the terminal ends of a cartridge type electrical component.

Provided on each of the cavity halves or sections 32 and 36 are locking bayonet tab members such as 52 and guide pins such as 54, which when the cavity sections 32 and 36 are in an overlying position with respect to mating cavity sections 34 and 38, respectively, are received in aligned apertures such as 56 and 58 adjacent cavity sections 34 and 38. As can be seen in FIG. 1, each of the cavity sections further includes at the outwardly extending end thereof complementary extension sections 60 and 61, and 62 and 63, respectively, which upon the mating of the respective cavity sections provide surrounding electrical insulating portions 65 and 67, respectively, (shown in FIG. 2) to prevent short circuits, arcing, or the like. The extension sections 60 and 61 of socket 24, which are greater in length than the cavity sections 32 and 34, respectively, have integrally formed therebetween the hinge section 40, while the hinge section of socket 26 is integrally formed with the cavity sections 36 and 38 which are greater in length than the extension sections 61 and 63 thereof. A flat plate or shelf 64 integrally formed with support structure 22, between sockets 24 and 26, has also been provided to prevent electrical leakage between the rectifier unit and a mounting panel or chassis upon which the unit is mounted. In addition to the above, a shoulder portion 66 (FIG. 1) has been provided between the support structure 22 and the respective sockets 24 and 26 further to prevent arcing or electrical shorting between the rectifier and a panel to which it is mounted.

Referring now specifically to FIG. 2 of the drawings, the mounting devcie 14 is shown in its closed or assembled state after cavity sections 32 and 36 have been placed in an overlying relation with respect to their mating cavity sections 34 and 38, respectively, hinge sections 40 and 42 having been folded over. It should be noted that the assembled sockets 24 and 26 each includes a cutout section 68 and 70, respectively, which permit the mounting of the cartridge type or tubular electrical component or rectifier unit therein.

FIG. 3 of the drawings illustrates the manner in which the device 14 is mounted to a panel board or chassis. The panel board 72, as can be seen in FIG. 3, includes therein a pair of apertures 74 and 76. To mount device 14 on panel board 72, snap-fastener stud 18 and guide pin 19 are placed into a respective aperture 74 and 76 of the panel board so that the stud 18, due to its shape and the fact that it is resilient and flexible, is able to be locked thereinto to secure device 14 to panel board 72. Guide pin 19 which is received in aperture 76 in the panel board has been provided to prevent the device 14 from moving rotationally about the surface of the board and to key the device properly end-to-end. As will be noted, foot members 20 of the device which, as shown in FIGS. 1 and 2, extend outwardly at an acute angle from the base portion 16 of the device have now, as shown in FIG. 3, been flattened so as to extend in a parallel direction from the base 16. The foot members 20 in this manner exert a force against the panel board 72 which serves to secure stud 18 in aperture 74 in the panel board.

As can be seen in FIG. 3, a cartridge type electrical component 78 which includes a pair of terminals 80 on the opposite ends thereof has been placed in position in sockets 24 and 26 of device 14. The terminals 44 of respective sockets 24 and 26 make both electrical and mechanical contact with the terminals 80 of electrical components 78. The opposing surfaces of the terminals, as will be explained in more detail when looking at FIG. 12 of the drawings, are recessed to receive therein the terminals 80 of the electrical component 78. The coil spring member 46 located in socket 26, as described above, provides a resilient load against terminal 44 therein to enable the sockets 24 and 26 to accommodate therebetween electrical components, such as a cartridge rectifier 78, of various lengths.

FIGS. 4 through 6 of the drawings illustrate in greater detail the stud 18 of device 14 used as shown in FIG. 3, to mount the device to a support panel 72. The stud 18 comprises a blunted end or head portion 11 and a pair of outwardly extending, rounded wing portions 13 with a center guide portion 15, all of which are integrally formed with the mounting device. The wing portions 13 are separated from base portion 16 of the mounting device by a gap 17, to allow the panel board 72 to be secured therebetween upon the insertion of the stud into the aperture 74 in the panel board. The center guide portion 15, along with the rounded wing portions 13, provides a three-point mounting arrangement which insures easy and accurate mounting of the stud in an aperture, such as 74. As can best be seen in FIG. 6 of the drawings, the wing portions 13 are separated from the center guide portion 15 at one end thereof, so that the first-mentioned portions are able to be squeezed toward the latter portion upon the insertion of head portion 11 into an aperture. Once the wing portions 13 have been pushed completely through the aperture, they, being resilient, snap back to assume their original position, thus locking the device to the panel board.

Figures 7, 8, 9, 10, 11, 12:
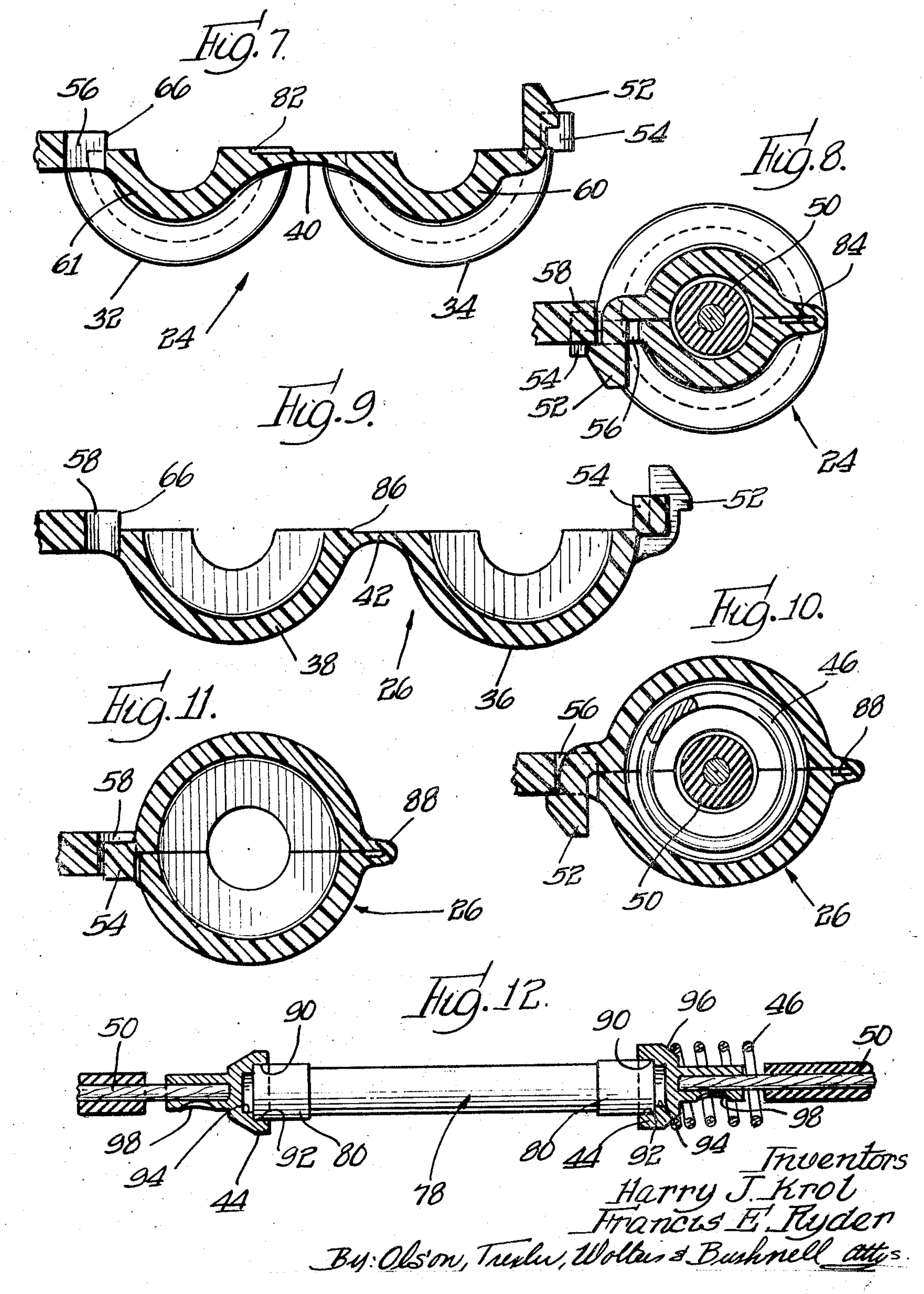
FIG. 7 is an enlarged cross-sectional view of a first socket of the rectifier mounting device before assembly as shown in FIG. 1, being taken along the line 7—7 thereof.
FIG. 8 is a similarly enlarged cross-sectional view of the socket of FIG. 7 in folded or assembled relation as shown in FIG. 2, being taken along the line 8—8 thereof.
FIG. 9 is a cross-sectional view similar to FIG. 7 of a second socket of the rectifier mounting device as shown in FIG. 1 being taken along the line 9—9 thereof.
FIG. 10 is a cross-sectional view of the socket member of FIG. 9, as shown in FIG. 2, being taken along the line 10—10 thereof.
FIG. 11 is a cross-sectional view of the socket member of FIG. 9 as shown in FIG. 2, being taken along the line 11—11 thereof.
FIG. 12 is an enlarged longitudinal view of the first and second sockets and cartridge rectifier as shown in FIG. 3 of the drawings, illustrating in more detail the relation therebetween.

FIGS. 7 and 8 of the drawings illustrate clearly the socket 24 of the device 14 as it appears both in the open or unassembled state (FIG. 7) and in its closed or assembled state (FIG. 8). Referring to FIG. 7 of the drawings, tab 52 and guide pin 54, as well as aperture 56 in which tab 52 is received in a locking relation therein, can be clearly seen. It will be noted that hinge section 40 between cavity halves 32 and 34, which is formed with and interconnects the cavity halves at insulating extensions 60 and 61, while being evenly formed with extension 60, is offset with respect to extension 61 to form step 82. Thus, a gap 84 appears between the overlapped hinge section upon the mating of cavity halves 32 and 34. The gap 84 has been provided because the material used in the formation of the device is of a type which will not readily fold 180 degrees upon itself. Thus, if it were required to so bend, the material might become fractured and cause the separation of the cavity halves.

In addition to the above, the locking relation of tab 52 into aperture 56 is illustrated in FIG. 8. Also, guide pin 54 is shown extending into corresponding aperture 58. The guide pin 54, in addition to insuring the correct mating of the cavity halves, also prevents the twisting of the halves with respect to each other and possible unlocking of tab 52 from aperture 54 resulting therefrom.

The longer, spring-loaded socket 26 is illustrated in FIGS. 9–11, both in its open or unassembled position (FIG. 9) and in its closed or assembled position (FIGS. 10 and 11). Once again the tab and guide pin 52 and 54, respectively, and guide pin aperture 58 can readily be seen in FIG. 9. The hinge section 42 of socket 26, unlike socket 24, extends and is formed between the cavity halves 36 and 38. In the same manner, however, the hinge section 42 is formed evenly with cavity half 36, but is offset by step 86 from cavity half 38. This likewise has been done because of the plastic material used in molding the device, as explained above. As will be noted in FIGS. 10 and 11, a gap 88, like gap 84 of socket 24, appears at hinge section 42 when the cavity halves are mated.

In addition to the above, FIGS. 10 and 11 further describe the relation of tab 52 and aligned aperture 56, and guide pin 52 and aligned aperture 58, respectively, upon the mating of cavity halves.

Referring now to FIG. 12 of the drawings, there is shown an enlarged sectioned view of the terminals 44 and their respective leads 50, with the terminals 80 of the cartridge type rectifier unit 78 mechanically and electrically contacting the terminals 44. It will be noted that each of the terminals 44 includes a telescoping or stepped, recessed face portion 80 which, as shown, includes two levels 92 and 94, the last of which has a smaller diameter. As can be seen, the terminals 80 of cartridge rectifier unit 78 are in this case circular in shape and have a diameter which is accommodated by the first level 92 of recess 90. If the cartridge were of a type having a smaller diameter, however, the terminal thereof would extend into the second level 94 of recess 90. Any number of levels may be formed in the recess 90 so as to accommodate cartridge type electrical components of all diameters and sizes.

Helical spring 46 is shown at the right of FIG. 12, pressing against the rear portion 96 of terminal 44. The spacing between terminals 44 is sufficient to accommodate the cartridge 78; however, if the cartridge were shorter or longer in length, spring 46 would be expanded or compressed accordingly so that, upon the insertion of the cartridge into the sockets housing the terminals 44, any length cartridge within the limits of compression and expansion of spring 46 could be accommodated.

Leads 50, as shown in FIG. 12, have been connected to terminals 44 by crimping a portion 98 of the latter; however, soldering or other known methods of connecting terminals to the leads may be employed, if desired.

The formation of mounting devices 14, as mentioned above, is accomplished by injection molding. Every portion of the device except the terminals, spring and leads, is formed as a one-piece unit. This enables the device to be made quickly and inexpensively and with a minimum of labor. Further, because there is a minimum of parts involved, there is less of a chance that the parts will become separated or lost in transportation and handling. The device is preferably molded of a polysulfone plastic which, because of its insulating properties helps to make the device corona resistant. This is especially advantageous when mounting typical reticfier units in television receivers, or the like, for these units are capable of handling approximately 10,000 volts.

The combination of the polysulfone material and the construction of the device which serves to mount a rectifier in spaced relation from a chassis or frame with a flat shelf of insulating material therebetween, makes the chance of arcing almost nil. The further addition of socket extensions 63 and 65 to protect the connections of leads 50 to terminals 44, provides an even greater deterrent to short circuit or arcing.

Thus, the one-piece molded electrical component mounting device according to the invention provides a versatile, durable, easy-to-use, inexpensive device which can be employed with cartridge type electrical components, such as rectifiers, of practically all sizes and lengths.

It will be obvious to one skilled in the art that changes and modifications may be made without departing from this invention in its broadest aspect, and therefore it is the aim in the appended claims to cover all such changes and modifications as come within the true spirit and scope of the invention.

What is claimed is:

1. A device for the mounting on a support surface of an electrical component of the type having terminals on opposite ends thereof, said device comprising: an integral one-piece molded unit including a base portion having means for securing said device to said support surface and a pair of sockets integrally formed with an extending from said base portion in spaced-apart, opposing relation to each other, at least one of said sockets including a pair of interconnected, hinged cavity halves, each of said sockets including therein a terminal for electrically and mechanically contacting a respective one of said terminals of said component upon the receipt of respective ends of said component in a corresponding one of said sockets, one of said terminals being spring loaded for accommodating components of various sizes.

2. A device as claimed in claim 1 wherein said base portion further includes a shelf portion between said sockets; and on either side of said shelf portion, adjacent a respective one of said sockets, a shoulder portion for the prevention of electrical leakage from said electrical component to said support surface.

3. A device as claimed in claim 1 wherein each of said sockets comprises at least a pair of molded cavity sections being interconnected at first sides thereof by an integral hinge section formed therebetween, said cavity sections including on second, opposite sides from said hinge section, latching means for securing said cavities to each other thereat so as to form said socket, and wherein each of said terminals is secured within a respective one of said sockets.

4. A device as claimed in claim 3 wherein said latching means includes a snap tab and guide pin arrangement being formed integrally with and on the second side of one of said cavity sections of said socket and a pair of apertures at the second side of the other of said cavity sections, said apertures being aligned with said tab and guide pin, respectively, so that upon the moving of one of said cavity sections into an overlying relationship with the other of said cavity sections, said tab and guide pin are received in a respective one of said apertures to lock said cavity sections together.

5. A device as claimed in claim 4 wherein said support surface includes therein a first and second aperture, wherein said means for securing said device to said support surface includes a stud having a pair of integrally formed resilient wing portions for snapping said stud into the first aperture in said support surface, a guide pin for receipt in the second aperture in said support surface, and a pair of resilient foot members extending from either end of said base portion for stabilizing said device against said support surface.

6. A device for mounting on a support surface a cartridge type rectifier having a first terminal on one end thereof and a second terminal on the other end thereof, said device comprising: a base portion including means for mounting said device to said support surface, said means including a resilient stud portion for snapping into an aperture in said support surface and a plurality of foot members for stabilizing said device against said support surface, and a pair of sockets carried by said base portion in spaced-apart opposing relation to each other, each of said sockets including a pair of interconnected, hinged cavity halves, and secured within each socket, between said cavity halves, a terminal for electrically and mechanically contacting a respective one of said terminal ends of said rectifier upon the receipt of each of said last-mentioned ends in a respective one of said sockets, one of the terminals of said sockets being spring loaded for accommodating rectifiers of varying lengths.

7. A device as claimed in claim 6 wherein each of said socket terminals includes a recessed face having at least two telescoping levels therein for accommodating cartridge type rectifiers having various sized terminals.

References Cited

UNITED STATES PATENTS

| | | | |
|---|---|---|---|
| 3,154,281 | 10/1964 | Frank | 248—201 |
| 3,354,454 | 11/1967 | Rueger | 339—208 |

FOREIGN PATENTS

| | | |
|---|---|---|
| 689,690 | 6/1930 | France. |
| 931,147 | 8/1955 | Germany. |

RICHARD E. MOORE, *Primary Examiner.*

U.S. Cl. X.R.

339—125